(12) United States Patent
Yudanov

(10) Patent No.: US 11,934,798 B2
(45) Date of Patent: Mar. 19, 2024

(54) COUNTER-BASED MULTIPLICATION USING PROCESSING IN MEMORY

(71) Applicant: Micron Technology, Inc., Boise, ID (US)

(72) Inventor: Dmitri Yudanov, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 707 days.

(21) Appl. No.: 16/836,773

(22) Filed: Mar. 31, 2020

(65) Prior Publication Data

US 2021/0303265 A1 Sep. 30, 2021

(51) Int. Cl.
| | | |
|---|---|---|
| G06F 7/544 | (2006.01) | |
| G06F 3/06 | (2006.01) | |
| G06F 7/523 | (2006.01) | |
| G06N 3/08 | (2023.01) | |

(52) U.S. Cl.
CPC .......... *G06F 7/5443* (2013.01); *G06F 3/0604* (2013.01); *G06F 3/0659* (2013.01); *G06F 3/0673* (2013.01); *G06F 7/523* (2013.01); *G06N 3/08* (2013.01)

(58) Field of Classification Search
CPC .............................. G06F 7/523; G06F 7/5443
See application file for complete search history.

(56) References Cited

U.S. PATENT DOCUMENTS

| | | | | |
|---|---|---|---|---|
| 10,146,537 | B2 * | 12/2018 | Tiwari | ................ G11C 7/1012 |
| 10,528,643 | B1 | 1/2020 | Choi et al. | |
| 2002/0083106 | A1 * | 6/2002 | Becker | ................... G06F 7/607 |
| | | | | 708/210 |
| 2017/0277659 | A1 | 9/2017 | Akerib et al. | |
| 2019/0102170 | A1 | 4/2019 | Chen et al. | |
| 2019/0362787 | A1 | 11/2019 | Lu et al. | |
| 2020/0020393 | A1 | 1/2020 | Al-shamma | |

OTHER PUBLICATIONS

International Search Report & Written Opinion, PCT/US2021/024481, dated Jul. 21, 2021.

* cited by examiner

*Primary Examiner* — Michael D. Yaary
(74) *Attorney, Agent, or Firm* — Greenberg Traurig

(57) ABSTRACT

The present disclosure is directed to systems and methods for a memory device such as, for example, a Processing-In-Memory Device that is configured to perform multiplication operations in memory using a popcount operation. A multiplication operation may include a summation of multipliers being multiplied with corresponding multiplicands. The inputs may be arranged in particular configurations within a memory array. Sense amplifiers may be used to perform the popcount by counting active bits along bit lines. One or more registers may accumulate results for performing the multiplication operations.

23 Claims, 11 Drawing Sheets

COUNTER-BASED MULTIPLICATION USING PROCESSING IN MEMORY

BACKGROUND

Generic processors may interface with memory components and caches to perform repeated calculations on stored data. Data may be loaded into a cache, the processor may then access the data, the processor may calculate a result, and then the result may be stored in memory. Processors may perform repetitive or intensive linear algebra operations by handling matrix elements. For example, processors may perform read/write operations to fetch data, process it, and store it in memory. These generic processors may be used to perform multiplication operations as part of more complex algorithms such as, for example, convolutional operations. In addition to generic processors, special purpose devices such as Processing In-Memory devices may include memory arrays and logic to perform operations on the contents of the memory arrays.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

Figure 1:
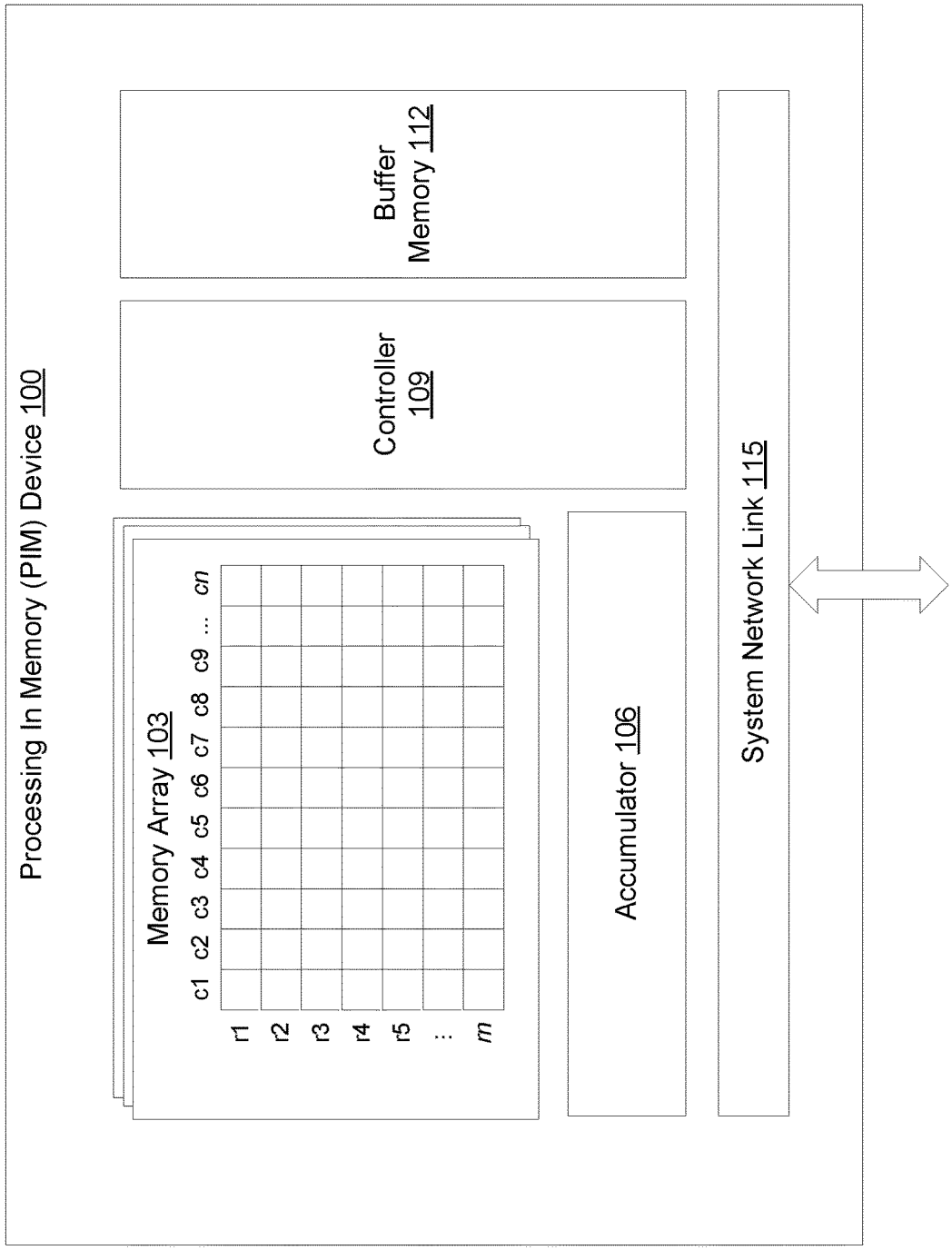
FIG. 1 is a drawing of a memory device according to various embodiments.

The present disclosure is directed to systems and methods that perform multiplication in a memory device using popcount operations. By performing multiplication in a memory device (e.g., performing operations "in-memory") at least some of the operands of the multiplication operations may be stored in memory with separately loading them in a system memory, cache, some other fast memory or the like. By performing multiplication operations, the memory device of the present disclosure may include components such as registers, controllers, and sense amplifiers, to perform multiplication operations directly in the memory device.

The present disclosure describes embodiments using a popcount operation. A popcount operation is an operation performed in a memory device where a range of memory cells are provided as an input and the number of high ("hi") bits (e.g., active bits or "ones") are counted. For example, if the range of memory cells include the binary values [1, 0, 1, 1, 0 1], then a popcount operation would yield the number four because there are four bits having the value of "one" (e.g., an active bit or hi bit).

The present disclosure describes various ways of structuring a memory device to perform popcount operations as part of a multiplication operation. A basic multiplication operation involves a multiplier (A) and multiplicand (B) which yield a product expressed as "A×B". A more complex multiplication operation may include one multiplier (A) and a plurality of multiplicands (B and C), where the product is expressed as "A×B+A×C" or alternatively "A×(B+C). In this case, the multiplicands are summed together and then multiplied by the multiplicand. The multiplicands may be referred to as "summands" which are operands to be summed together. Thus, in this example, the multiplier (A) is a common multiplier. A more complex multiplication operation may involve different multipliers corresponding to different multiplicands. For example, the multipliers (A and B) may correspond to multiplicands (C and D) such that the resulting product is expressed as "A×C+B×D." In this case, the operation may be referred to as 'dot product' of two vectors or number sequences [A, B] dot [C, D], or more broadly a sum of element-wise products of more than one vectors or sequences.

In some embodiments, the memory device is a special purpose device used to implement multiplication operations as a part of a convolutional operation in general (e.g. in a convolutional neural network). The memory device may be used to implement one or more layers in a convolutional neural network. The convolutional neural network may be designed for detecting: image features in image data, motion features in video streams, text patterns in textual data, statistical features in multi-dimensional complex data, scientific features in scientific processes and simulations, astronomical features in astronomical data coming from the space, weather conditions in world weather data as well as predictions based on them, words in voice audio data. The convolutional neural network may be used to detect features or characteristics in computer generated graphics, virtual reality data, and augmented reality data. Features may be detected for satellite imagery, long exposure generated graphics, time-lapse videos, slow-motion videos. The convolutional neural network may be configured to perform feature detection on graphical or visual representation of data collected from a variety of sources such as data repositories or databases. The data subject to feature detection may be data that is structured, data that is semi-structured, data that is unstructured, data objects generated from machines, data logs, real-time data generated from a remote source, data that is aggregated from a plurality of sources, data received over a network, data that has been pre-processed by external systems, data that has been subject to visual filters, or data that generated at least partially by an external computing system. Features that searched for within the data include visual patterns, horizontal lines, edges, vertical lines, various shapes, curves, angles, particular colors, orientations. In addition, simple features may be combined to formulate more complex features such as complex objects.

In addition to implementing convolution neural networks, the memory device may be configured as a Linear algebra accelerator in-memory device, a Neuromorphic processor in-memory device, a Memory Dual in-line Memory Module (DIMM) with compute capabilities, an in-memory graphics processor, and an intelligent solid-state drive (SSD) with computation. In addition, the memory device may include NAND Flash memory arrays, X-point arrays, or other memory arrays with compute capabilities. The memory device may be configured to perform Matrix-matrix multiplication and neural network inference and training.

The following discussion refers to the FIGS. to illustrate various embodiments of a memory device that uses pop-count operations to perform multiplication operations.

FIG. 1 is a drawing of a memory device 100 according to various embodiments. The memory device 100 as shown in FIG. 1 may be embodied as a Processing In Memory (PIM) device. However, the present disclosure is not limited only to PIM devices. A PIM device is a semiconductor device that comprises one or more memory arrays and a PIM processor coupled to these arrays in-memory. The PIM processor is configured to perform operations using data stored in the cells of the memory array without the need to perform time-intensive input/output operations, fetch operations, or load/store operations over a memory bus. In this respect, the PIM processor may access at least some data without a buffer memory or cache or bus to perform data and compute operations. In contrast, a host processor is coupled with one or more memory devices over a memory bus or other link. A host processor may be a central processing unit (CPU), digital signal processor, graphics processing unit (GPU), special purpose processor, or general-purpose processor that is installed in a device or system external to the memory device. The host processor may be installed in a computing device, lap top, mobile device, server, special purpose computer, general purpose computer.

The memory device 100 is an integrated circuit. The memory device 100 may be a semiconductor chip or die or a die stack. The memory device 100 may include one or more memory arrays 103. A memory array 103 comprises a plurality of rows and columns and may be defined in terms of a row-column size. The example of FIG. 1 shows a memory array 103 having rows labeled r1-rn and columns c1-cn. At each row and column intersection is a memory cell configured to store at least part of an operand in a multiplication operation. The operand may be a multiplier or a multiplicand. In this respect, an operand, such as, for example, the decimal number "9" may be stored as a series of binary bits "1001" across multiple memory cells.

A memory cell may be a single level cell that stores one binary bit (e.g., a bit that can have two values or states, e.g. "0" or "1" encoded as low or high value of a memory cell) or as a multi-level cell that includes multiple bits or levels (e.g., the cell that can store multiple bits). Examples of multi-level cells include QCL NAND Flash memory, which can have sixteen values or states encoded as Vt (threshold voltage) of a floating gate transistor thereby storing four bits or levels of data per memory cell. To illustrate a memory array made of multi-level cells, for example dual-level cells encoding 2-bit binary numbers, the decimal number "9" (expressed as the binary number "1001") may have the left part of the four-bit binary number (two most significant bits) stored in one multi-level cell as the binary number "10" while the right part (two least significant bits) may be stored in another dual-level cell as the binary number "01". In a memory device having single-level memory cells, the decimal number "9" may occupy at least four separate cells to represent the binary number "1001."

Thus, the memory array 103 is a hardware component used to store data as a plurality of array elements addressable by rows and columns. The memory device 100 may include several memory arrays 103 organized throughout the memory device 100. The memory array 103 may be implemented using various types of technologies, organizations or aspects. The memory array may be defined as including both volatile and nonvolatile memory. Volatile components may be those that do not retain data values upon loss of power. Nonvolatile components may be those that retain data upon a loss of power. The memory array 103 may comprise random access memory (RAM), read-only memory (ROM), solid-state memory arrays. RAM may comprise static random-access memory (SRAM), dynamic random access memory (DRAM). The memory array 103 may comprise solid-state memory such as Flash memory, NOR Flash (e.g., Flash memory in a NOR configuration) or NAND Flash (e.g., Flash memory in a NAND configuration). The memory array may be resistive RAM (ReRAM), cross-point memory, or cross-bar 3D memory. Each type of memory technology used to implement the memory array may be accessed using a row, column, or other memory address. Rows may be referred to as word lines. A word line may comprise terminals of transistor gates of corresponding memory cells. Alternatively, a word line can be connected directly to memory cell matter, e.g. for resistor-like or for diode-like memory cells. Columns may be referred to as bit lines. A bit line may comprise source and/or drains of transistors that constitute memory cells, capacitor terminals of the capacitors that constitute memory cells, resistor terminals of the resistors that constitute memory cells, diode terminals of the diodes that constitute memory cells, or a combination thereof.

Memory array 103 comprises peripheral circuitry, which can be outside of the memory array 103 or a part of it. The peripheral circuitry may include an accumulator 106, a controller 109, a buffer memory 112, a system link 115, and potentially other integrated components such as, for example, sense amplifiers to sense data from memory array 103 and drivers to store data back to memory array 103.

The accumulator 106 may be, for example, a Fused Multiply-Accumulate (FMA) Unit 106. The accumulator 106 may be configured to perform dot product multiplication operations on arrays of data (or matrices) comprising operands such as, for example, multipliers or multiplicands. The operands for the multiplication operations may be supplied directly from the memory array 103 as well as from a controller 109. In some embodiments, the accumulator 106 may be dedicated to only perform dot product matrix calculations. The accumulator 106 may be configured to perform a multiply-accumulate operation that computes a product of input operands and adds that product to an accumulated value. The accumulator 106 may include one or more registers for storing intermediate values as part of a multiplication operation.

The controller 109 is a part of a processor of the memory device 100. The controller 109 may comprise integrated circuitry or logic embodied in hardware that is used to store data into the memory array 103. In addition, the controller 109 may receive, from locations outside the memory array 103. The controller 109 may implement to select bit lines and word lines in particular patterns according to logic, microcode, or other algorithms.

The memory device 100 may also include buffer memory 112. The buffer memory may be included as part of the controller 109 and/or a part of accumulator 106 or it may be external to the controller 109 and/or an accumulator 106 or it may be connected to these components 109 and 106 via an internal bus (e.g., a system link 115). Alternatively, the buffer memory 112 may be a part of memory array 103 allocated specifically for buffer purposes described herein. Specifically, a part of memory array 103 allocated for buffer memory may be a part of an array with faster access (e.g., having shorter path to the accumulator 106). The buffer memory 112 may comprise buffers to temporarily store data as the controller 109 and accumulator 106 perform multiplication operations. The controller 109 and/or accumulator 106 may write to or read from the buffer memory 112. For example, the buffer memory 112 may be used to store intermediate results as part of a multiplication operation. The buffer memory 112 may also store part of the operands of the multiplication operation such as, for example, one or more multipliers, while the multiplicands are stored in the memory array 103.

The system link 115 of the memory device 100 may provide data and/or control signals between the memory device 100 and external systems. The system link 115 may couple to various components of the memory device 100 such as, for example, the memory array 103, the accumulator 106, the controller 109, the buffer memory 112, and other components. Thus, system link 115 may include an internal link amongst various components of memory device 100 that allow these components to exchange data and/or control signals among each other. The system link 115 may comprise input/output ports to couple to external systems outside the memory device 100. The system link 115 may be an Input/Output (IO) bus such as, for example, a DDR4 bus or PCIe bus. In this respect, an external system may read or write data to the memory array 103, the accumulator 106, and buffer memory 112. In addition, external systems may transmit control signals to the controller 109 to program or otherwise control the controller 109.

An external system may include a host processor with a PCB motherboard, wherein the memory device 100 is connected to host processor over a bus such as DDR4, DDR5 or PCIe or alike. The external system may execute an operating system, applications, libraries, scripts, or programming languages. The external system may include one or more server racks or computers or other arrangements. A server may be a single installation or may be distributed among many different geographical locations. The external system may include a plurality of computing devices that together may comprise a hosted computing resource, a grid computing resource and/or any other distributed computing arrangement. In some cases, the external system may correspond to an elastic computing resource where the allotted capacity of processing, network, storage, or other computing-related resources may vary over time. The external system may implement one or more virtual machines that use the resources of a computing system. Various software components may be executed on one or more virtual machines. The external system may also include additional memory devices 100. In this respect, an instance of a memory device 100 may query, control or access data in any additional memory device 100 installed in a system.

The system link 115 may allow the memory device 100 to couple to external systems that together combined or separately implement a convolutional neural network. For example, the memory device 100 may implement a layer within a neural network or multiple layers within a neural network. For example, the memory device 100 may be used to implement a convolution layer. The system link 115 may extract outputs of a memory device 100 and input them into different layers of the neural network located in other memory devices or other parts of external system. A pooling layer in a neural network may obtain outputs from the system link 115 of a memory device 100, may perform pooling operations, and may pass the result as inputs into the memory device 100. For example, the output data generated by the accumulator 106 may be accessed by the system link 115 and processed externally by a pooling layer, where those results are supplied to the memory array 103 of the memory device 100 via the system link 115 for additional processing. The following FIGS. provide examples of configurations and operations that may occur within a memory device such as, for example, the memory device 100 of FIG. 1.

Figure 2A:
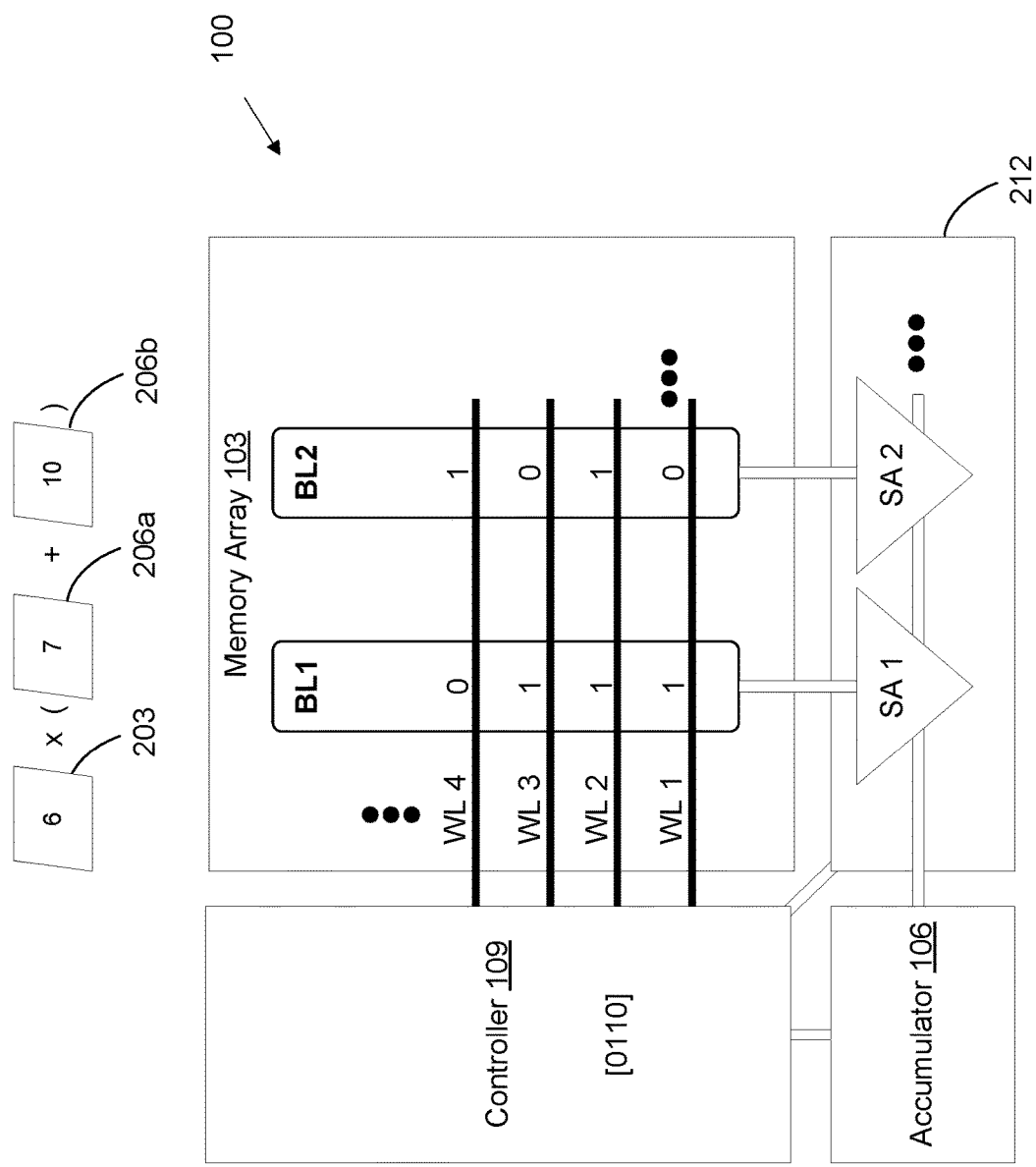
FIGS. 2A-2B are drawings of a memory device that performs in-memory multiplication with a common multiplier using popcount operations according to various embodiments.
Figure 2B:
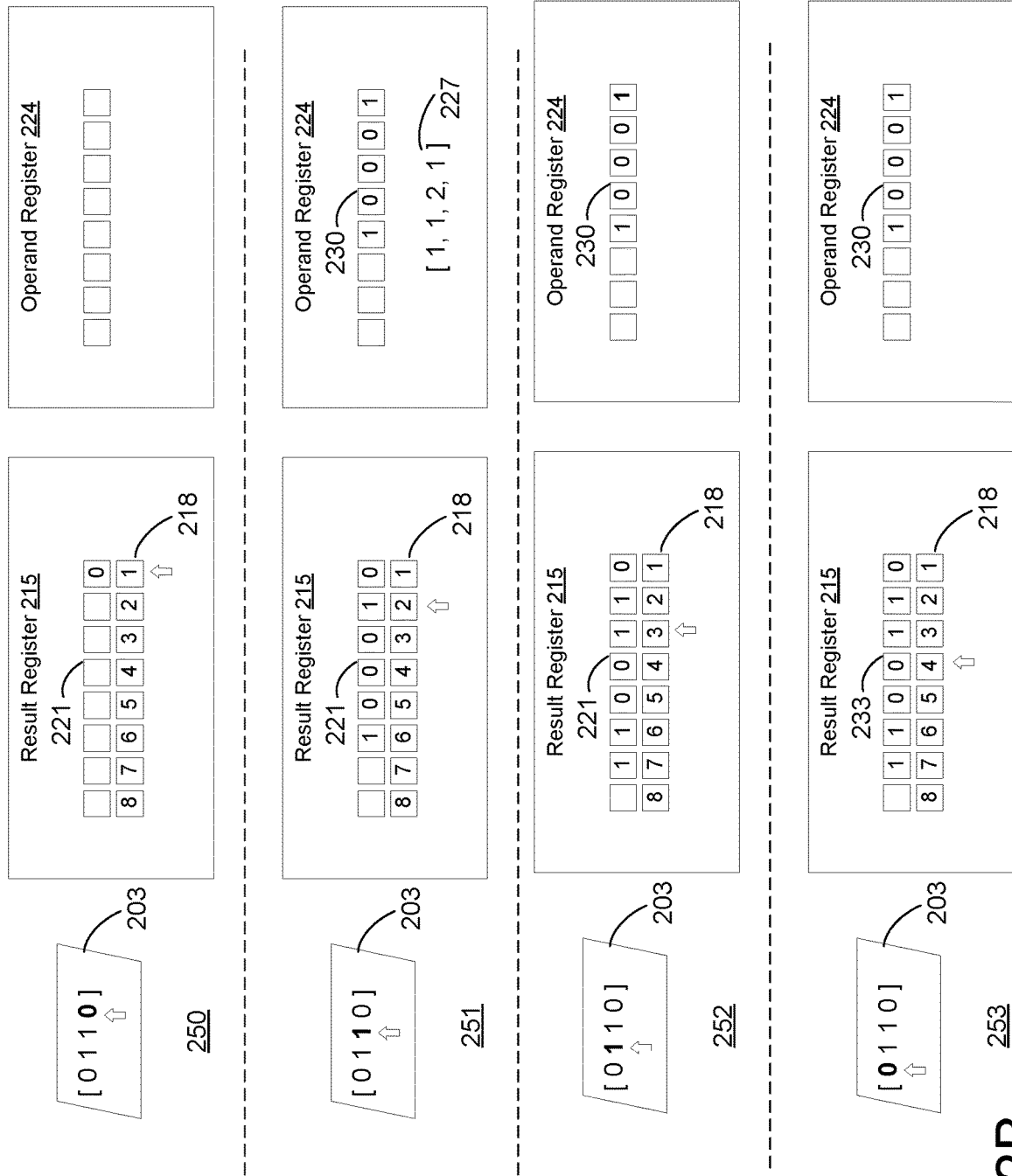

FIGS. 2A-2B are drawings of a memory device 100 that performs in-memory multiplication with a common multiplier using popcount operations according to various embodiments. In FIG. 2A, a memory device 100 is configured to perform a multiplication operation where a multiplier 203 is applied to the sum of a first multiplicand 206a and a second multiplicand 206b. In the example depicted in FIG. 2A, the multiplier 203 has a value of decimal number "6", the first multiplicand 206a has a value of decimal number "7" and the second multiplicand 206b has a value of decimal number "10". Alternatively, this can be interpreted as 6×7+6×10 as opposed to 6×(7+10), according to the distributive property of multiplication. In this respect, A×(B+C) may be expressed as the following dot product of two vectors: [A, A]×[B, C]. FIG. 2A thus, depicts an embodiment where a common multiplier 203 is applied to multiplicands 206a, 206b. However, any number of multiplicands may be included as part of the multiplication operation shown in FIG. 2A.

The memory device 100 may store the first multiplicand 206a in a first bit line (e.g., BL 1) of a memory array and may store the second multiplicand 206b in a second bit line (e.g., BL 2) of the memory array. In some embodiments, the first and second bit lines are in the same memory array. In other embodiments, the first bit line and second bit lines are in different arrays. When storing a multiplicand 206a, 206b in a bit line, the value of the multiplicand may occupy a plurality of memory cells such that they span a plurality of word lines. For example, the first multiplicand 206a having the example decimal number "7" is represented in binary as "0111". The least significant bit "1" may be stored at a first word line (e.g., WL 1). The second bit "1" may be stored at a second word line (e.g., WL 2). After that, the third bit "1" may be stored at a third word line (e.g., WL 3). And the most significant bit "0" may be stored at a fourth word line (e.g., WL 4). The second multiplicand 206b having the example decimal number "10" is represented in binary as "1010". The least significant bit "0" may be stored at first word line (e.g., WL 1). The second bit "1" may be stored at a second word line (e.g., WL 2). After that, the third bit "0" may be stored at a third word line (e.g., WL 3). And the most significant bit "1" may be stored at a fourth word line (e.g., WL 4). Thus, the multiplicands 206a, 206b are stored in a bit-serial configuration.

The multiplier 203 may be stored in a memory array 103 of the memory device 100, a buffer memory 112 of the memory device, or some other source. FIG. 2A shows the controller 109 that applies the multiplier 203 having the example decimal number "6" (represented as the binary number "0110") to the sum of the multiplicands 206a, 206b.

The memory device 100 may include a sense amplifier (SA) array 212. The sense amplifier array 212 may include a plurality of sense amplifiers (e.g., SA 1, SA 2). In some embodiments, each sense amplifier is dedicated to a corresponding bit line. For example, each sense amplifier may access only one bit line. In the example of FIG. 2A, a first sense amplifier (SA 1) accesses the first bit line (BL 1) and a second sense amplifier (SA 2) accesses the second bit line (BL 2). Each sense amplifier receives input when the controller 109 activates the bit line coupled to the sense amplifier.

The sense amplifiers in the sense amplifier array 212 are configured to perform a popcount operation when the bit line for a sense amplifier is activated and when one or more word lines are activated. The sense amplifier is configured to count the number of active bits (e.g., bits represented as a "1" or having "hi" value) for all memory cells that are selected by the controller 109. For example, counting can be implemented as a long shift register or chain, that matches the size of the sense amp array and integrated within it. In this case, the controller would shift out all bits. An alternative implementation includes a rolling ripple carry adder. In this embodiment, the right-most sense amp sends its value to the sense amp positioned to the left. The current sense amp accumulates the result from the right with the value sensed on a bit line and sends it to the next left sense amp. This continues until a final value is transmitted to the controller. Gradual bus width increase towards the controller would provide more bandwidth for a rolling value in this embodiment. Another embodiment includes using a logarithmic-reducing tree counter/adder. This embodiment performs relatively fast calculations, however, it may require relatively more wiring to connect various components. In yet another embodiment, the sense amplifier array may include a thermometric to binary converter with bypassing capabilities. In this embodiment, sense amps with a current value of zero (sensed from bit line) are bypassed. This may also include using a lookup table. In another embodiment, the sense amp array 212 includes a Flash analog to digital converter (ADC).

FIG. 2A depicts an example where the bit positions of the multiplicands 206a, 206b are stored along the same word line. That is, least significant bits of each multiplicand 206a, 206b are stored on the same word line, the most significant bits of each multiplicand 206a, 206b are stored on the same word line, and the same applies for the bits in between. In other embodiments, the multiplicands 206a, 206b may be stored along different word line ranges or partially overlapping word line ranges.

FIG. 2B represents an example of performing the multiplication operation of FIG. 2A using the multiplicands 206a, 206b that are summed together and multiplied by the multiplier 203. Specifically, FIG. 2B shows four sequences to perform multiplication using popcount operations by sequencing through bits of the multiplier 203. The memory device 100 may include one or more registers such as, for example, a result register 215 and an operand register 224. The result register 215 may store a sum value 221 that updates at each sequence until the multiplication operation is complete. The sum value 221 after sequencing through all bits of the multiplier represents the multiplication result 233 upon completion. The bit position 218 of the sum value is incremented at each sequence, where the controller selectively performs an accumulation operation depending on the bit position of the multiplier 203. This is explained in more detail below.

In the first sequence 250, the bit position of the multiplier begins at position 1, which is the least significant bit of the multiplier 203. As shown in FIG. 2B an arrow is used to illustrate the tracking of the bit position of the multiplier 203. The controller 109 is configured to activate word lines and send control signals to an accumulator 106 and the sense amp array 212. The controller 109 reads the value of the multiplier 203 at position 1 which is the binary bit "0" (e.g., the least significant bit of binary number "0110" or decimal number "6"). When the value is a predetermined value such as a binary "0" or "low," the controller 109 records a "0" in the result register 215 at the current bit position (position 1 for the first sequence 250). Thereafter, the bit position is incremented to be position 2.

In the second sequence 251, the bit position of the multiplier 203 is at position 2, which is the binary bit "1" (e.g., the second bit from the least significant bit of binary number "0110" or decimal number "6"). If the value is a predetermined value such as a binary "0" or "low," the controller 109 records a "0" in the result register 215 at the current bit position such as in the case of first sequence 250. However, because the bit value of the multiplier 203 at position 2 is a binary "1", then the controller performs an initialization operation of the operand register 224 to store a popcount result 227, 230. For example, the first time a binary "1" appears, an initialization operation occurs. The initialization operation comprises performing popcount operations on the multiplicands 206a, 206b to generate a popcount result 227, where each number in the popcount result represents a number of 'hi' or '1' bits (alternatively it can be any predetermined value of choice) in each memory row or a part of it that stores the multiplicands. The popcount result may be stored as a flattened binary number 230 in the operand register 224. The popcount result 227, 230, may remain in the operand register 224 until the multiplication operation is complete. The popcount operations may be performed only once in response to the presence of a binary "1" being present at a bit position of the multiplier 203.

To perform the popcount operations, the controller 109 sequentially activates the word line of the memory array(s) 103 that store the multiplicands 206a, 206b to count the number of binary "1s" that are present at each position of the multiplicands 206a, 206b. For example, referring to FIG. 2A, the controller 109 activates BL 1 and BL2 so as to perform popcount operations on the multiplicands 206a, 206b stored along these bit lines. The controller 109 activates WL 1 to perform a first popcount operation. With BL 1, BL 2, and WL 1 activated, the sense amplifier array 212 counts a total of one binary "1s". Specifically, (BL 1, WL 1) has a binary "1" and (BL 2, WL 1) has no binary "1s." Thus, the popcount operation for the least significant bit of the multiplicands yields one binary "1."

Next, WL 2 is activated for the next bit position of the multiplicands 206a, 206b. The popcount operation yields two binary "1s." Next, WL 3 is activated for the next bit position of the multiplicands 206a, 206b. The popcount operation yields one binary "1." Lastly, WL 4 is activated for the next bit position of the multiplicands 206a, 206b. The popcount operation yields one binary "1." After sequencing through all word lines of the multiplicands 206a, 206b, the popcount result 227 is [1, 1, 2, 1] ranging from most significant bit to least significant bit. Thus, the popcount result counts the number of binary "1s" (e.g, a predetermined value) at each bit position across one or more multiplicands 206a, 206b. The popcount result 227 may be flattened into a binary number 230, where MSB=>[1, 1, 2, 1]<=LSB equates to the binary number "10001". To flatten a result, the flattening operation includes a binary summation and carry propagation from right to left. For example, flattening the array [1, 1, 2, 1] is performed as follows starting from LSB to MSB (right to left): the value "1" generates a result of "1" at first bit position and a value of "0" to be carried over to the next bit position. Next, the value "2" with an incoming "0" carry value generates "0" result at the second bit position and value of "1" to be carried over to the next bit position. Next the value of "1" with incoming "1" carry value generates a "0" result at third bit position and value of "1" to be carried over to the next bit position. A value of "1" with an incoming "1" carry value generates a result of "0" at the fourth bit position and a value of "1" to be carried over to the next bit position. A value of "0" with an incoming "1" carry value generates a result of "1" at the fifth bit position and a value of "0" to be carried over. Each step in this computation sequence may be performed immediately upon generating a popcount result from each row. In some embodiments, the flattening operation may be fully performed in the background of memory accesses performed during the performance of popcount operations of each memory row. Thus, this flattening operation may have no latency overhead.

After generating the popcount result 227, 230, the operand register 224 is initialized. A flag may be set to indicate that the popcount operations do not need to be performed again for the instant multiplication operation. In addition to detecting a binary "1" at position 2 of the multiplier 203, the controller 109 performs an accumulation operation at position 2 where the current sum value 221 is added to the popcount result 227, 230 at the current bit position. This yields a current sum value of "100010." For example, with a binary "0" recorded in position 1, the accumulation operation adds the popcount result "10001" starting at position 2, which is the current position.

In the third sequence 252, the bit position of the multiplier 203 is at position 3, which is the binary bit "1" (e.g., the third bit from the least significant bit of binary number "0110" or decimal number "6"). In response to detecting a binary "1", the controller performs an accumulation operation starting at position 3 using the current sum value 221, which is "100010." Specifically, the result register 215 is updated so that the new sum value is the sum of "100010" and the popcount result 230 which is "10001" but where the sum occurs at position 3 of the result register 215. In other words, the accumulation operation may be expressed as the binary sum of "100010" and "1000100". This yields the result of the current sum value 221 to be "1100110". The popcount result 230 does not need to be recalculated after the operand register was initialized.

In the fourth sequence 253, the bit position of the multiplier 203 is at position 4, which is the binary bit "0" (e.g., the most significant bit of binary number "0110" or decimal number "6"). In response to detecting a binary "0" (e.g., a predetermined binary value), the controller 109 bypasses the accumulation operation. Because all bit positions have been sequenced, the current sum value 233 is the multiplication result of "1100110," which is expressed as decimal number "102" and which is also the multiplication result of 6×(7+ 10).

The example of a multiplication process described with respect to FIGS. 2A and 2B show how a common multiplier 203 is applied to the sum of multiplicands 206a, 206b using a plurality of popcount operations. For example, the popcount operations are performed on the multiplicands 206a, 206b to generate a popcount result 230 which represents the sum of the multiplicands 206a, 206b. This sum of the multiplicands 206a, 206b, is stored in the operand register 224. As the controller 109 sequences through bit positions of the common multiplier 203 (from least to most significant bit), the popcount result 230 is selectively accumulated based on the current bit position and based on whether the bit value of the current bit position is a predetermined value (e.g., a binary "1"). In other words, the controller 109 may selectively accumulate the current sum value 221 of the result register 215 when detecting a binary "1" as the multiplier bit positions are sequenced and where the accumulation is performed at the current bit position of the current sum value 221.

To further illustrate the examples of FIGS. 2A and 2B, the examples show storing at least one summand in a memory array 103 of a memory device 100. The summand may be the multiplicands 206a, 206b that are summed together and then multiplied with the multiplier 203. The accumulator 106 may perform fused multiply-accumulation operations to multiply the multiplier 203 to the popcount result 230 determined from using the summand(s) as inputs. The fused multiply-accumulation operations may involve selectively accumulating a current sum value 221 with the popcount result 230 by sequencing through the at least one bit of the multiplier 203. The fused multiply-accumulation result is generated upon completing the sequencing through the bits of the multiplier 203.

Selective accumulation may involve accumulation upon detecting a first predetermined value (e.g., binary "1") at the current bit position of the multiplier 203 and not accumulating (e.g., bypassing the accumulation operation) upon detecting a second predetermined value (e.g., binary "0") at the current bit position of the multiplier 203. The selective accumulation latency may be minor compared to the time it takes to perform popcount computations by sense amplifiers because the former may be performed in local fast registers while the latter may be performed as part of the memory array access, which normally has longer latency. Thus, to speed up the multiple operations in memory, embodiments may involve performing popcount operations on rows of other memory arrays and storing other multipliers concurrently with performing selective accumulation on the current popcount results. In this respect, an extra operand register used to store and/or flatten next popcount result as it arrives from SA array may be included. In another embodiment, a selective accumulator with multiple operand registers may serve as multiple arrays such that their operations are fully hidden by the memory accesses of memory arrays performing the popcount operations.

Figure 3:
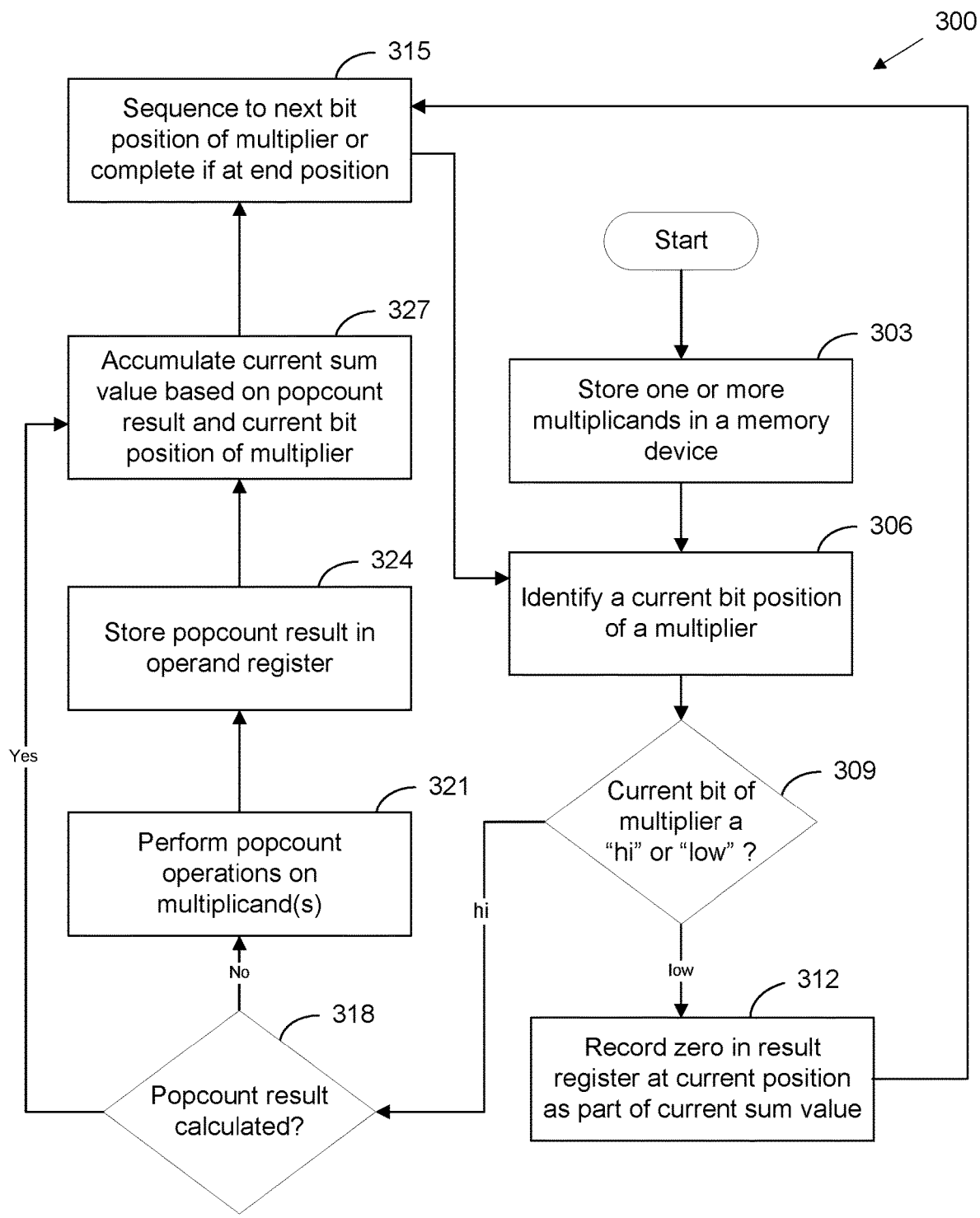
FIG. 3 is a flowchart illustrating the functionality of a memory device that performs in-memory multiplication of a common multiplier using popcount operations according to various embodiments.

FIG. 3 is a flowchart illustrating the functionality of a memory device that performs in-memory multiplication of a common multiplier using popcount operations according to various embodiments. The boxes in the flowchart may represent microcode, machine code, firmware, or other software executable by a controller of a memory device 100. The boxes of the flowchart may alternatively represent steps in a method 300. The method may be performed by a memory device 100.

At item 303, the memory device 100 may store one or more multiplicands 206a, 206b in one or more memory arrays. The multiplicands 206a, 206b may be stored in a bit-serial configuration along separate bit lines. The bit position of each multiplicand 206a, 206b may be positioned on the same word lines or on different word lines.

At item 306, the memory device 100 identifies the current bit position of the multiplier 203. The memory device may begin with the least significant bit of the multiplier 203 (e.g., position 1). The current bit position may be tracked and stored in a memory such as, for example, the buffer memory 112. When beginning the multiplication operation, the bit position begins with position 1 and then increments through each bit position of the multiplier 203 until the most significant bit of the multiplier is handled.

At item 309, the memory device 100 checks the value of the multiplier 203 at the current bit position to determine whether it is a first predetermined value (e.g., binary "1" or "hi") or a second predetermined value (e.g., binary "0" or "low"). If the value is the second predetermined value (e.g., binary "0" or "low"), the memory device 100, at item 312, records a binary "0" in the result register 215 at the current bit position. The result register 215 stores a current sum value 221 that gets updated until the multiplication operation completes. Thereafter, at item 315, the memory device 100 sequences to the next bit position of the multiplier 203. This completes the sequence for handling one bit position.

If the current bit of the multiplier 203 is a first predetermined value (e.g., binary "1" or "hi"), then the memory device 100 checks if popcount result 330 has been calculated at 318. If not, then at 321, the memory device 100 performs popcount operations on the multiplicand(s) 206a, 206b. For example, the memory device 100 may activate the bit lines and word lines of the memory cells that store the multiplicands 206a, 206b, and then use a sense amplifier array 212 to count the number of binary "1s."

The popcount result 227 may be flattened into a binary number that represents the popcount result 230. Mathematically, the popcount result 230 represents the sum of the multiplicands (e.g., treated as summands).

At item 324, the popcount result 230 is stored in an operand register 224. A flag may be set indicating that the operand register 224 contains a popcount result 230.

At item 327, the memory device accumulates a current sum value based on the popcount 230 result and the current bit position of the multiplier 203. Because the accumulation operation is performed based on whether the value corresponding to the current bit of the multiplier 203, the accumulation operation is therefore selective. For example, the accumulation operation is performed selectively in response to detecting a binary "1" as the bit positions of the multiplier 203 are sequenced. In addition, the popcount result 230 is added to the current sum value at the current bit position. The memory device 100 then proceeds to item 315. If all bit positions of the multiplier have been handled, the multiplication process ends and the current sum value is the multiplication result.

Figure 4A:
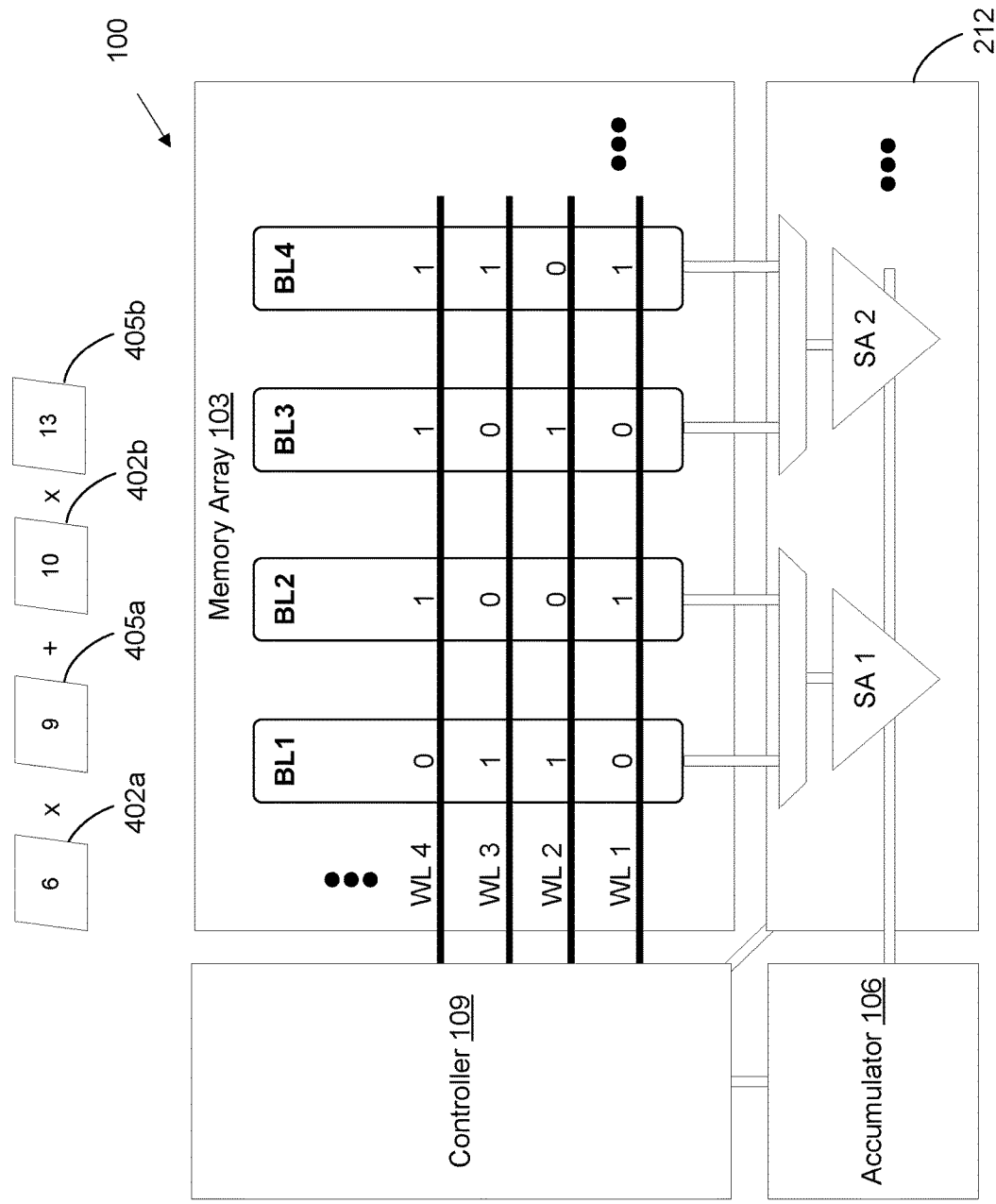
FIGS. 4A-4E are drawings of a memory device that perform in-memory multiplication of different multipliers using popcount operations according to various embodiments.

FIGS. 4A-4E are drawings of a memory device that perform in-memory multiplication of different multipliers using popcount operations according to various embodiments. FIG. 4A illustrates an example of performing a multiplication operation using a plurality of multipliers 402a, 402b and corresponding multiplicands 405a, 405b. For example, FIG. 4A illustrates a memory device 100 that multiplies a first multiplier 402a with first multiplicand 405a and sums that result with the multiplication of a second multiplier 402b and a second multiplicand 405b. In the example depicted in FIG. 4A, the first multiplier 402a has a value of decimal number "6," the first multiplicand 405a has a value of decimal number "9," the second multiplier 402b has a value of decimal number "10, and the second multiplicand 405b has a value of decimal number "13". FIG. 4A thus, depicts an embodiment where different multipliers 402a, 402b are applied to respective multiplicands 405a, 405b. However, any number of multipliers and multiplicands may be included as part of the multiplication operation shown in FIG. 4A. Depending on context, the terms "multiplier" and "multiplicand" are interchangeable. For example, multiplicands 405 can be used as multipliers and multipliers 402 can be used as multiplicands.

FIG. 4A shows different operands (e.g., multipliers 402a, 402b and multiplicands 405a, 405b) of a multiplication operation where the operands are stored in a bit-serial configuration and where the bit positions of each operand share the same word lines. For example, starting from the least significant bits of the operands, the bits of the operands are stored along a first word line (WL 1) and range to the fourth word line (WL 4). The first multiplier 402a is stored along a first bit line (BL 1), the first multiplicand 405a is stored along a second bit line (BL 2), a second multiplier 402b is stored along a third bit line (BL 3), and the second multiplicand 405b is stored along a fourth bit line (BL 4).

FIG. 4A depicts an example where multipliers 402a, 402b are stored along odd-numbered bit lines and the multiplicands 405a, 405b are stored along even-numbered bit lines. In this respect, bit lines may alternate between storing multipliers 402a, 402b and storing multiplicands 405a, 405b.

In addition, the memory device 100 may be configured so the consecutive pairs of bit lines are coupled to the same sense amplifier. For example, BL 1 and BL 2 couple to a first sense amplifier SA 1 and BL 3 and BL 4 couple to a second sense amplifier SA 2. In this respect, the bit lines that store a multiplier and corresponding multiplicand couple to the same sense amplifier.

The multiplication operation illustrated in the example of FIG. 4A may represent a dot product calculation that generates a dot product result. For example, the multipliers may originate from a first matrix and the multiplicands may originate from a second matrix. The dot product calculation is applied to multiplying the first matrix with the second matrix to generate a dot product result. The dot product calculation may be used in as value in a feature map used in a convolutional neural network. For example, one matrix may comprise a convolutional filter while another matrix may comprise a portion of data that is subject to feature detection using the convolutional filter.

While FIG. 4A depicts some embodiments of configuring a memory device to perform a multiplication operation using a plurality of multipliers 402a, 402b and multiplicands 405a, 405b, other arrangements are within the scope of the present disclosure. For example, the operands used in the multiplication operation of FIG. 4A may be stored on different bit lines of the same memory array 103 or in bit lines of different memory arrays 103. For example, the first multiplier 402a and second multiplier 402b may be stored in a first memory array 103 while the second multiplicand 405a and second multiplicand 405b may be stored in a second memory array 103. The bit lines from the first and second memory arrays may be coupled with the same sense amplifiers. As another example, the multipliers 402a, 402b may be stored along a first bit line while the multiplicands 405a, 405b, may be stored along a second bit line. As another example, the multiplier 402a, and multiplicand 405a may be stored along a first bit line while the multiplier 402a, and multiplicand 405b, may be stored along a second bit line. In addition, in some embodiments, the multipliers 402a, 402b may be received by the controller 109 from a memory other than the memory array 103. For example, the multipliers 402a, 402b may be stored in buffer memory 112 or received from an external source via a system link 115. In another embodiment, each sense amp may have a local to it, a respective register to store its multiplier (or multiplicand), and corresponding multiplicand (or multiplier) are accessed from memory array.

Figure 4B:
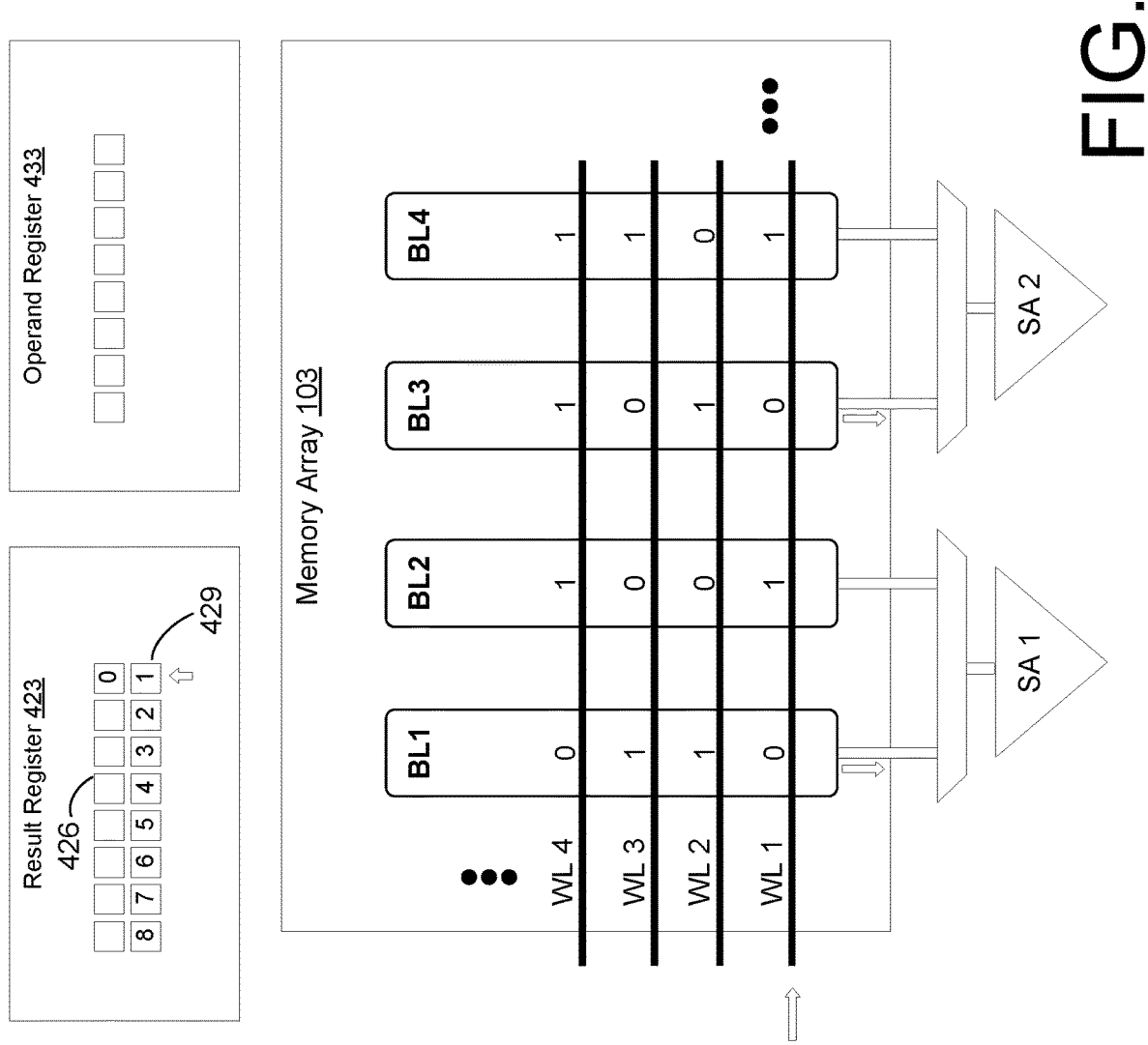

FIGS. 4B-4E build on the example of FIG. 4A by showing the multiplication operation as it sequences through each bit position of the multipliers 402a, 402b. FIG. 4B shows the multiplication operation at bit position 1 of the multipliers 402a, 402b. The controller 109 activates the bit lines that store the multipliers 402a, 402b. In this case, the first multiplier 402a is stored along BL 1 and the second multiplier 402*b* is stored along BL 3. FIG. 4B illustrates the activation of BL 1 and BL 3 by presenting an arrow along these bit lines. The controller 109 also selects the word line corresponding to position 1 of the multipliers 402*a*, 402*b*, which, in the example, is WL 1. The activation of WL 1 is shown as by presenting an arrow at this word line. The first sense amplifier SA 1 detects a binary "0" and the second sense amplifier SA 2 also detects a binary "0". When only binary "0s' are detected for all multipliers at their current bit position, the controller 109 records a binary "0 as the current sum value 426 of a result register 423 at the current bit position 429. Based on the presence of only binary "0s" for a particular bit position, the controller bypasses popcount operations and accumulation operations. Thereafter, the current bit position increments by one to the next bit position of the multipliers 402*a*, 402*b*.

Figure 4C:
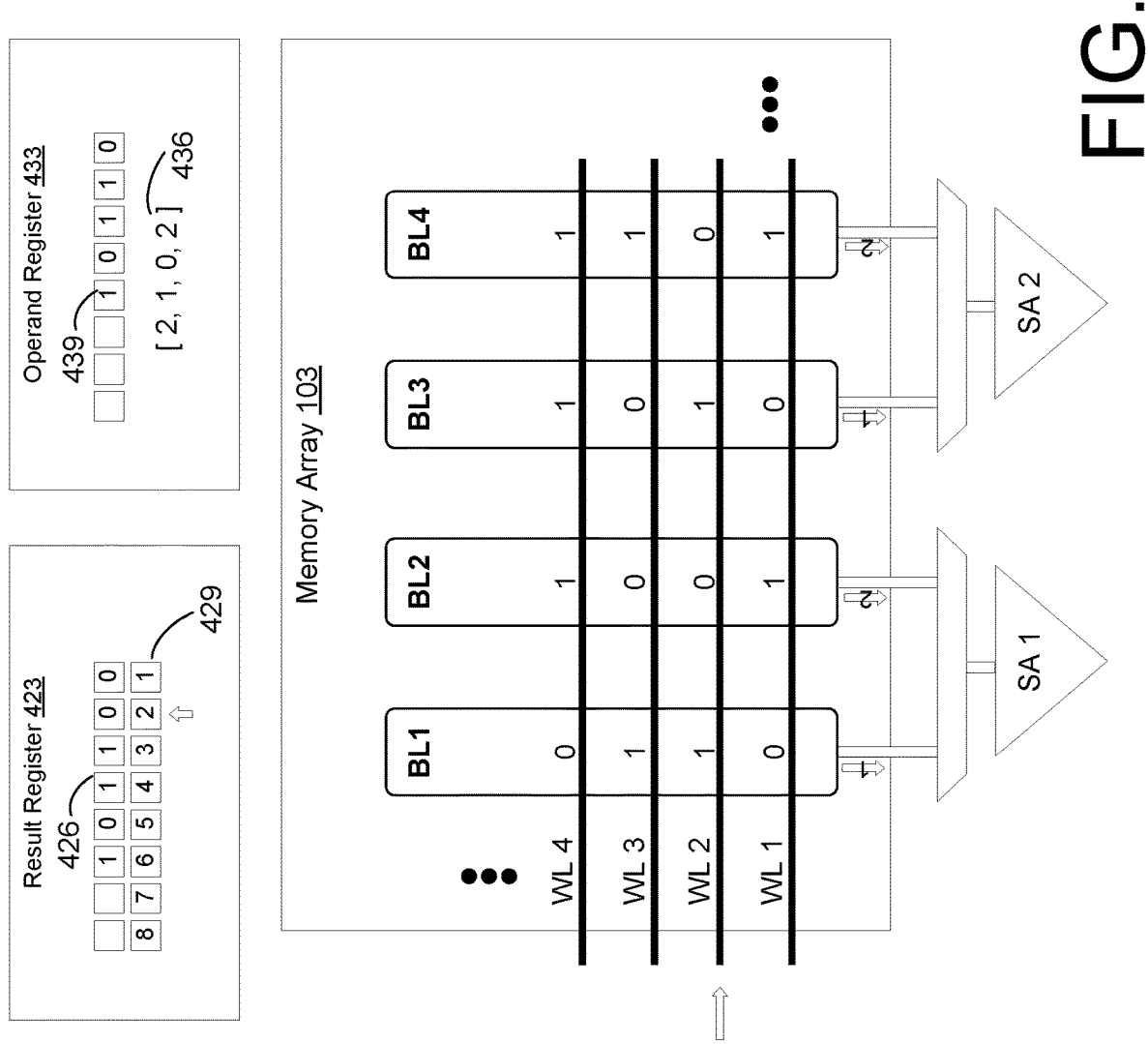

FIG. 4C shows the multiplication operation at bit position 2 of the multipliers 402*a*, 402*b*. The controller 109 activates the bit lines that store the multipliers 402*a*, 402*b* which are BL 1 and BL 3. FIG. 4C illustrates the activation of BL 1 and BL 3 by presenting an arrow (with the number 1) along these bit lines. The controller 109 then selects the word line corresponding to position 2 of the multipliers 402*a*, 402*b*, which, in the example, is WL 2. The activation of WL 2 is shown as by presenting an arrow at this word line. The first sense amplifier SA 1 detects a binary "1" and the second sense amplifier SA 2 also detects a binary "1". For each multiplier 402*a*, 402*b* that has a binary "1" at the current position, the corresponding multiplicand 405*a*, 405*b*, is identified and popcount operations are performed on the identified multiplicands 405*a*, 405*b*. For example, because the first multiplier 402*a* yielded a binary "1" at position 2, the bit line for its corresponding multiplicand (e.g., the first multiplicand 405*a*) is selected. Likewise, because the second multiplier 402*b* also yielded a binary "1" at position 2, the bit line for its corresponding multiplicand (e.g., the second multiplicand 405*b*) is selected. FIG. 4C illustrates the activation of BL 2 and BL 4 by presenting an arrow (with the number 2) along these bit lines.

Popcount operations are then performed on the selected multiplicands 405*a*, 405*b* by activating the word lines associated with the selected multiplicands. In this case, the popcount operations include activating WL 1, which yields a count of two "1s", activating WL 2 which yields a count of zero "1s", activating WL 3, which yields a count of one "1", and activating WL 4, which yields a count of two "1s". The popcount result 436 is thus, MSB=>[2, 1, 0, 2]<=LSB. Flattening the popcount result 436 into binary produces the number "10110" which is a binary version of the popcount result that is stored in the operand register 433. The popcount result 439 represents the sum of the selected multiplicands 405*a*, 405*b*.

After the popcount result is generated, the controller 109 adds the popcount result 439 to the current sum value 426 stored in the result register 423 to update the current value 426 in the result register 423. Moreover, the accumulation operation occurs at bit position 2. This produces a current sum value 426 of "101100." Thereafter, the current bit position increments by one to the next bit position of the multipliers 402*a*, 402*b*.

Figure 4D:
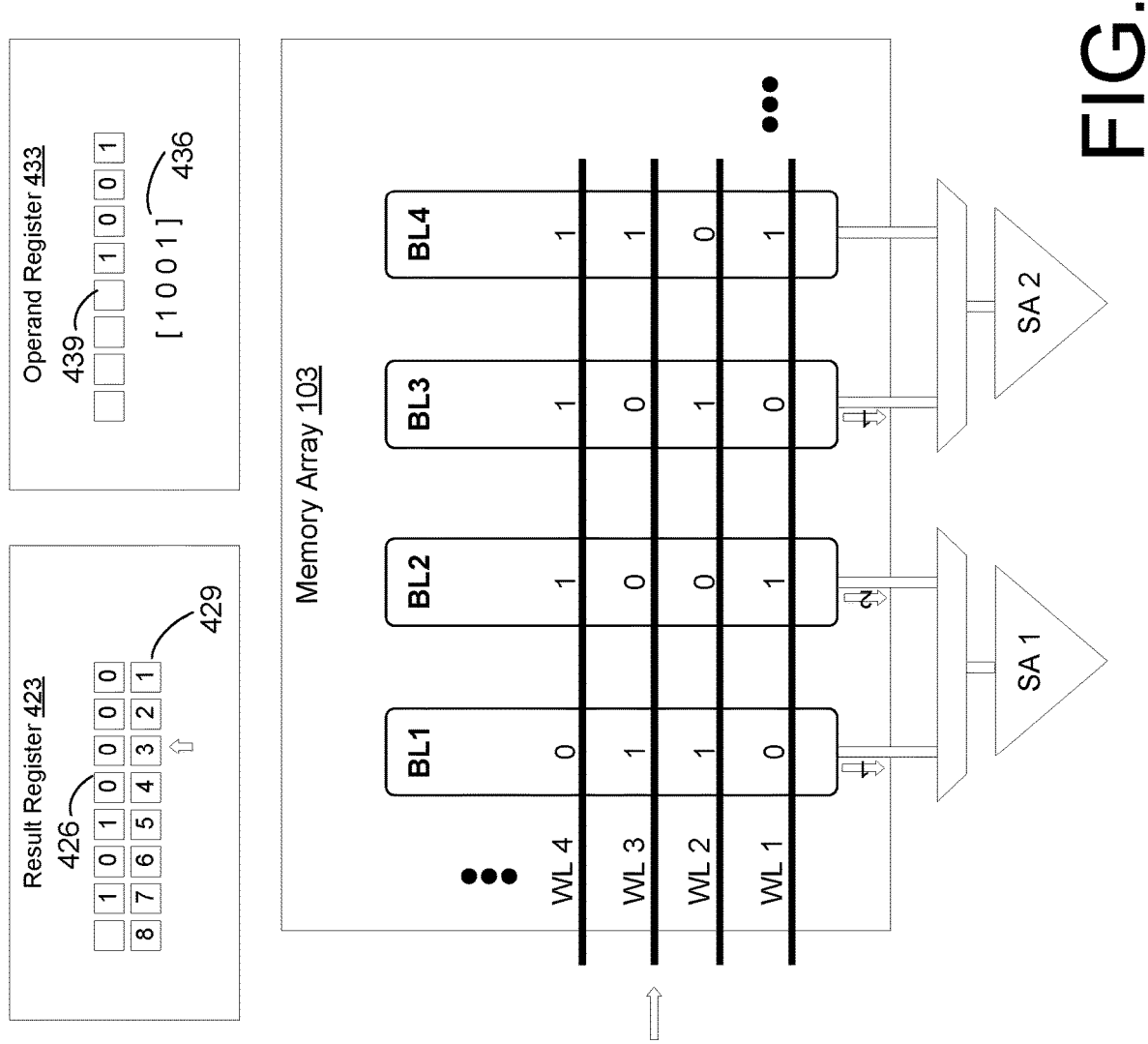

FIG. 4D shows the multiplication operation at bit position 3 of the multipliers 402*a*, 402*b*. The controller 109 again activates the bit lines that store the multipliers 402*a*, 402*b* which are BL 1 and BL 3. FIG. 4D illustrates the activation of BL 1 and BL 3 by presenting an arrow (with the number 1) along these bit lines. The controller 109 then selects the word line corresponding to position 3 of the multipliers 402*a*, 402*b*, which, in the example, is WL 3. The activation of WL 3 is shown as by presenting an arrow at this word line. The first sense amplifier SA 1 detects a binary "1" and the second sense amplifier SA 2 also detects a binary "0". For each multiplier 402*a* that has a binary "1" at the current position, the corresponding multiplicand 405*a*, is identified and popcount operations are performed on the identified multiplicands 405*a*. For example, because the first multiplier 402*a* yielded a binary "1" at position 3, the bit line for its corresponding multiplicand (e.g., the first multiplicand 405*a*) is selected. However, because the second multiplier 402*b* yielded a binary "0" at position 3, the bit line for its corresponding multiplicand (e.g., the second multiplicand 405*b*) is deactivated. FIG. 4D illustrates the activation of BL 2 by presenting an arrow (with the number 2) along this bit line.

Popcount operations are then performed on the selected multiplicand 405*a* by activating the word lines associated with the selected multiplicand. In this case, the popcount operations include activating WL 1, which yields a count of one "1", activating WL 2 which yields a count of zero "1s," activating WL 3, which yields a count of zero "1s," and activating WL 4, which yields a count of one "1." The popcount result 436 is thus [1, 0, 0, 1]. Flattening the popcount result 436 into binary produces the number "1001" which is a binary version of the popcount result that is stored in the operand register 433. The popcount result 439 represents the sum of the selected multiplicands 405*a*. When only one multiplicand 405*a* is selected, the sum is equivalent to the value of the multiplicand 405*a*.

After the popcount result is generated, the controller 109 adds the popcount result 439 to the current sum value 426 stored in the result register 423 to update the current value 426 in the result register 423. Moreover, the accumulation operation occurs at bit position 3. This produces a current sum value 426 of "1010000." Thereafter, the current bit position increments by one to the next bit position of the multipliers 402*a*, 402*b*.

Figure 4E:
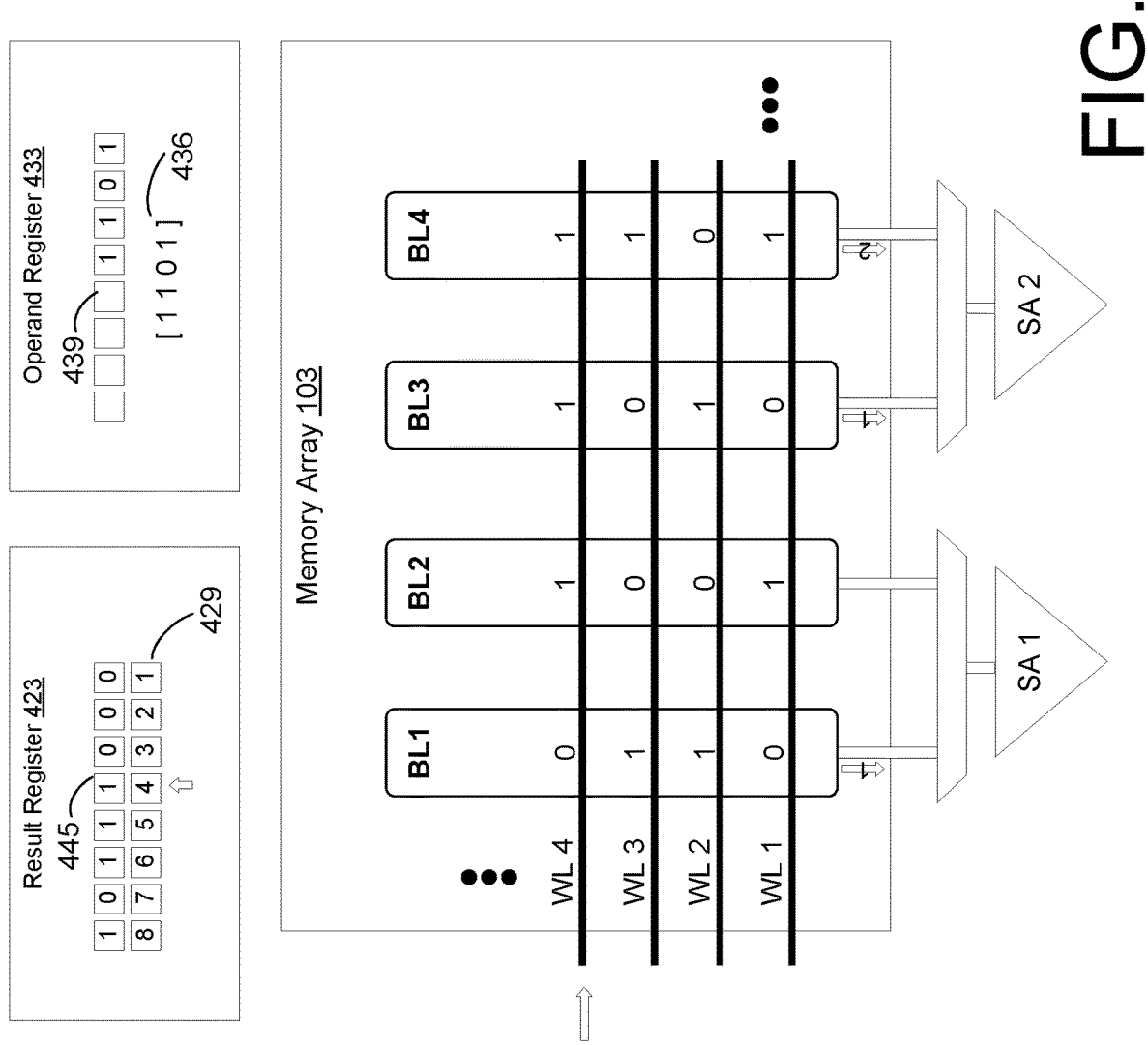

FIG. 4E shows the multiplication operation at bit position 4 of the multipliers 402*a*, 402*b*. The controller 109 again activates the bit lines that store the multipliers 402*a*, 402*b* which are BL 1 and BL 3. FIG. 4E illustrates the activation of BL 1 and BL 3 by presenting an arrow (with the number 1) along these bit lines. The controller 109 then selects the word line corresponding to position 4 of the multipliers 402*a*, 402*b*, which, in the example, is WL 4. The activation of WL 4 is shown as by presenting an arrow at this word line. The first sense amplifier SA 1 detects a binary "0" and the second sense amplifier SA 2 also detects a binary "1". For each multiplier 402*b* that has a binary "1" at the current position, the corresponding multiplicand 405*b*, is identified and popcount operations are performed on the identified multiplicands 405*b*. For example, because the first multiplier 402*a* yielded a binary "0" at position 4, the bit line for its corresponding multiplicand (e.g., the first multiplicand 405*a*) is deactivated. And, because the second multiplier 402*b* yielded a binary "1" at position 4, the bit line for its corresponding multiplicand (e.g., the second multiplicand 405*b*) is selected. FIG. 4D illustrates the activation of BL 4 by presenting an arrow (with the number 2) along this bit line.

Popcount operations are then performed on the selected multiplicand 405*b* by activating the word lines associated with the selected multiplicand. In this case, the popcount operations include activating WL 1, which yields a count of one "1," activating WL 2 which yields a count of zero "1s," activating WL 3, which yields a count of one "1," and activating WL 4, which yields a count of one "1". The popcount result 436 is thus [1, 0, 1, 1] MSB=>[1, 1, 0, 1]<=LSB. Flattening the popcount result 436 into binary produces the number "1101" which is a binary version of the popcount result that is stored in the operand register 433. The popcount result 439 represents the sum of the selected multiplicands 405b.

After the popcount result is generated, the controller 109 adds the popcount result 439 to the current sum value 426 stored in the result register 423 to update the current value 426 in the result register 423. Moreover, the accumulation operation occurs at bit position 4. This produces a current sum value 426 of "10111000" (184 in decimal). Because the controller sequenced through all bit positions of the multipliers from least to most significant bit, the multiplication operation is complete: 184=6×9+10×13. The value in the result register 423 represents the multiplication result 445, which may also be a dot product result when the operands represent matrix elements.

Figure 5:
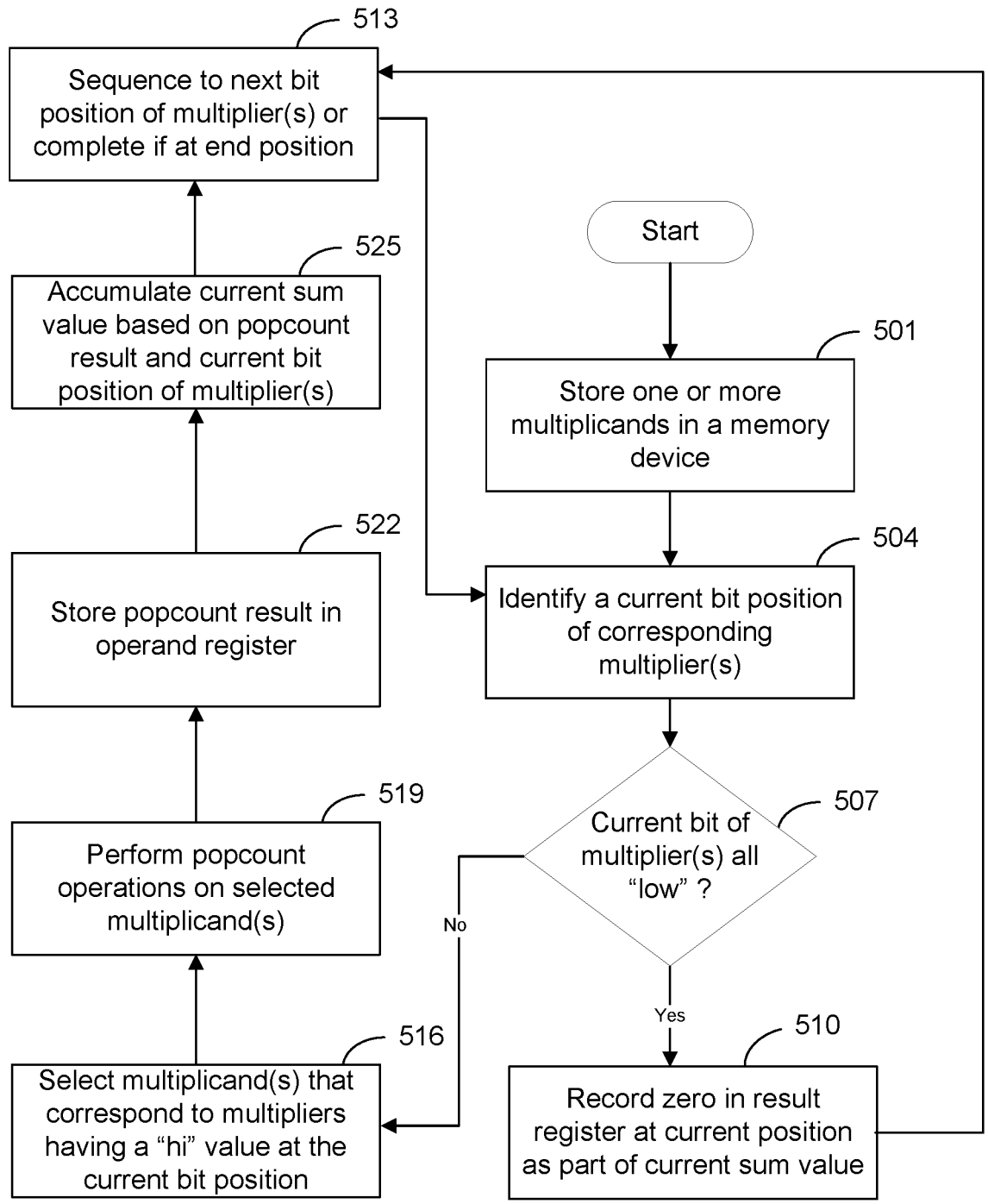
FIG. 5 is a flowchart illustrating the functionality of a memory device that performs in-memory multiplication of different multipliers using popcount operations according to various embodiments.

FIG. 5 is a flowchart illustrating the functionality of a memory device that performs in-memory multiplication of different multipliers using popcount operations according to various embodiments. The boxes in the flowchart may represent microcode, machine code, firmware, or other software executable by a controller of a memory device 100. The boxes of the flowchart may alternatively represent steps in a method 500. The method may be performed by a memory device 100.

At item 501, the memory device 100 may store one or more multiplicands 405a, 405b in one or more memory arrays. In some embodiments, the memory device 100 may store multipliers. The multiplicands 405a, 405b may be stored in a bit-serial configuration along separate bit lines. The bit position of each multiplicand 405a, 405b may be positioned on the same word lines or on different word lines.

At item 504, the memory device 100 identifies the current bit position of the multipliers 402a, 402b. The memory device 100 may begin with the least significant bit of the multipliers 402a, 402b (e.g., position 1). The current bit position may be tracked and stored in a memory such as, for example, the buffer memory 112. When beginning the multiplication operation, the bit position begins with position 1 and then increments through each bit position of the multiplier 402a, 402b until the most significant bit of the multiplier is handled.

At item 507, the memory device 100 checks the values of the multipliers 402a, 402b at the current bit position to determine whether it is a first predetermined value (e.g., binary "1" or "hi") or a second predetermined value (e.g., binary "0" or "low"). If the value is the second predetermined value (e.g., binary "0" or "low") for all multipliers 402a, 402b, the memory device 100, at item 510, records a binary "0" in the result register 423 at the current bit position. The result register 423 stores a current sum value 426 that gets updated until the multiplication operation completes. Thereafter, at item 513, the memory device 100 sequences to the next bit position of the multipliers 402a, 402b. This completes the sequence for handling one bit position.

If any current bit of the multipliers 402a, 402b is equal to a first predetermined value (e.g., binary "1" or "hi"), then the memory device 100, at 516 selects the multiplicands 405a, 405b, that correspond to multipliers having a binary "1" or "hi" value at the current bit position. The controller 109 may select the bit lines associated with the cells that store the selected multiplicands 405a, 405b.

At item 519, the memory device 100 performs popcount operations on the selected multiplicand(s) 405a, 405b. For example, the memory device 100 may activate the bit lines and word lines of the memory cells that store the multiplicands 405a, 405b, and then use a sense amplifier array 212 to count the number of binary "1s."

The popcount result 227 may be flattened into a binary number that represents the popcount result 439. Mathematically, the popcount result 439 represents the sum of the selected multiplicands (e.g., treated as summands).

At item 522, the popcount result 439 is stored in an operand register 433.

At item 525, the memory device 100 accumulates a current sum value based on the popcount result 439 and the current bit position of the multipliers 405a, 405b. Because the accumulation operation is performed based on whether any values corresponding to the current bits of the multiplier 402a, 402b, the accumulation operation is therefore selective. For example, the accumulation operation is performed selectively in response to detecting a binary "1" as the bit positions of any of the multipliers 402a, 402b that are sequenced. In addition, the popcount result 439 is added to the current sum value at the current bit position. The memory device 100 then proceeds to item 513. If all bit positions of the multipliers have been handled, the multiplication process ends and the current sum value is the multiplication result. An accumulation operation on the current bit position may be performed concurrently while accessing the next multiplier and/or performing a popcount operation.

Figure 6:
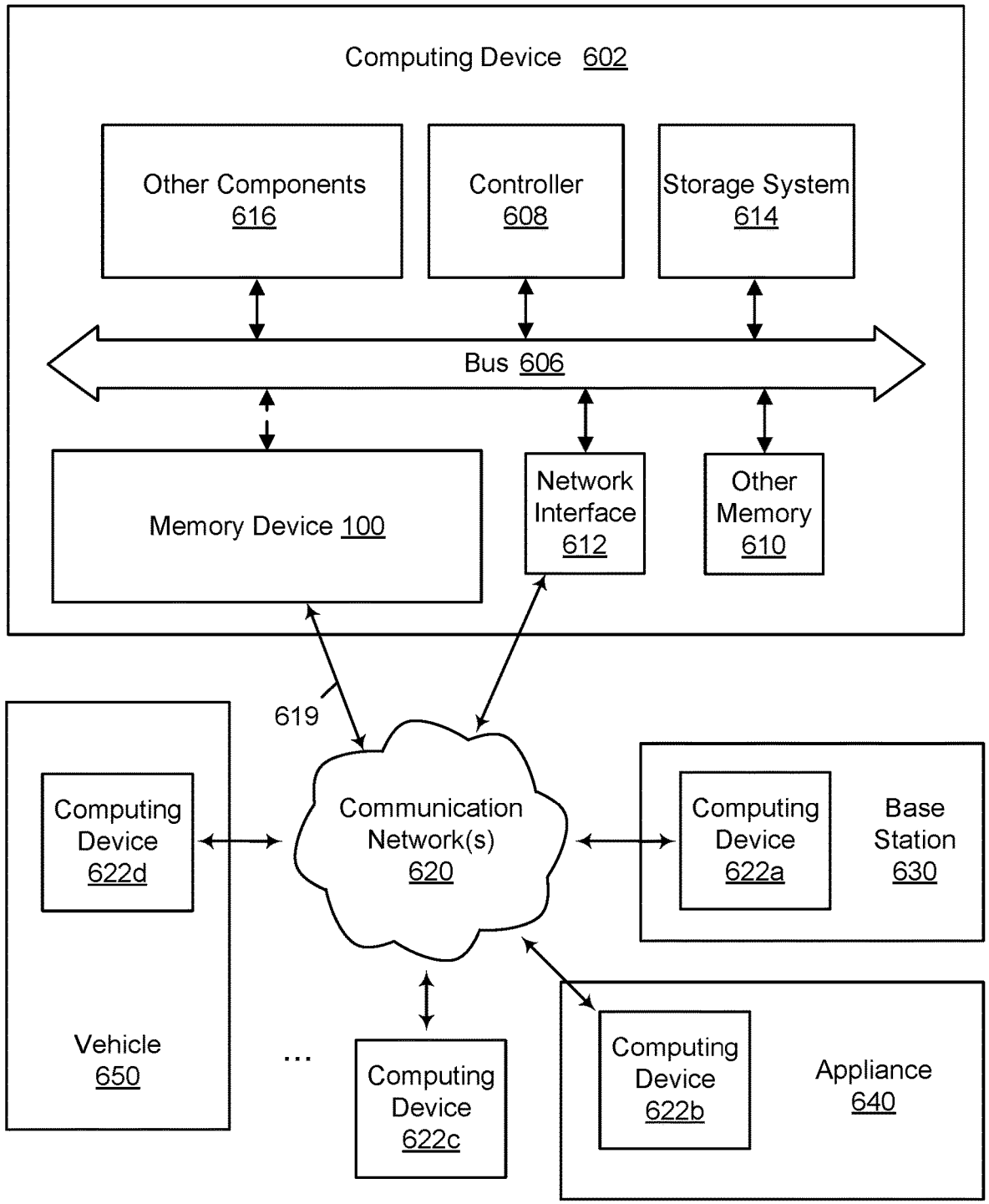
FIG. 6 is a schematic drawing showing a system that includes a memory device according to various embodiments.

FIG. 6 illustrates an example networked system 600 that includes a memory device 100, in accordance with some embodiments of the present disclosure. FIG. 6 illustrates example parts of an example of a computing device 602 which is part of the networked system 600. FIG. 6 shows how such computing devices can be integrated into various machines, apparatuses, and systems, such as IoT (Internet of Things) devices, mobile devices, communication network devices and apparatuses (e.g., see base station 630), appliances (e.g., see appliance 640), and vehicles (e.g., see vehicle 650).

The computing device 602 and other computing devices of the networked system 600 (e.g., see computing devices 622a, 622b, 622c, and 622d) can be communicatively coupled to one or more communication networks 620. The computing device 602 includes, for example, a bus 606, a controller 608 (e.g., a CPU), other memory 610, a network interface 612, a storage system 614, other components 616 (e.g., any type of components found in mobile or computing devices, GPS components, Input/Output (I/O) components, various types of user interface components, sensors, a camera, etc.), and a memory device 100. The other components 616 may also include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 606 communicatively couples the controller 608, the other memory 610, the network interface 612, the data storage system 614 and the other components 616, and can couple such components to the memory device 100 in some embodiments. For example, a system link 115 of the memory device 100 may couple to the bus 606.

The computing device 602 includes a computer system that includes at least controller 608, other memory 610 (e.g., random access memory (RAM), read-only memory (ROM), flash memory, dynamic random-access memory (DRAM) such as synchronous DRAM (SDRAM) or Rambus DRAM (RDRAM), static random-access memory (SRAM), crosspoint or cross-bar memory, crossbar memory, etc.), the memory device 100, and data storage system 614, which may communicate with each other via bus 606 (which can include multiple buses). In some embodiments, the memory device 100 may not communicate over bus 606.

To put it another way, FIG. 6 includes a block diagram of computing device 602 that has a computer system in which embodiments of the present disclosure can operate. In some embodiments, the computer system can include a set of instructions, for causing a machine to perform the methodologies discussed herein, when executed. In such embodiments, the machine can be connected (e.g., networked via network interface 612) to other machines in a Local Area Network (LAN), an intranet, an extranet, and/or the Internet (e.g., see network(s) 620). The machine can operate in the capacity of a server or a client machine in client-server network environment, as a peer machine in a peer-to-peer (or distributed) network environment, or as a server or a client machine in a cloud computing infrastructure or environment.

Controller 608 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 608 can also be one or more special-purpose processing devices such as an ASIC, a programmable logic such as an FPGA, a digital signal processor (DSP), network processor, or the like. Controller 608 is configured to execute instructions for performing the operations and steps discussed herein. Controller 608 can further include a network interface device such as network interface 612 to communicate over one or more communication networks (such as network(s) 620).

The data storage system 614 can include a machine-readable storage medium (also known as a computer-readable medium) on which is stored one or more sets of instructions or software embodying any one or more of the methodologies or functions described herein. The data storage system 614 can have execution capabilities such as it can at least partly execute instructions residing in the data storage system. The instructions can also reside, completely or at least partially, within at least one of the other memory 610 and the memory device 100 and/or within the controller 608 during execution thereof by the computer system, at least one of the other memory 610 and the memory device 100 as well as the controller 608 also constituting machine-readable storage media. The other memory 610 can be or include main memory or system memory of the computing device 602. The other memory 610 and the memory device 100 can have execution capabilities such as it can at least partly execute instructions residing in any memory of the computing device 602.

As mentioned, the networked system 600 includes computing devices, and each of the computing devices can include one or more buses, a controller, a memory, a network interface, a storage system, and other components. Also, each of the computing devices shown in FIG. 6 and described herein can include or be a part of a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the computing devices can be connected to network(s) 620 that may include a local device network such as Bluetooth or the like, a wide area network (WAN), a local area network (LAN), an intranet, a mobile wireless network such as 4G or 5G, an extranet, the Internet, and/or any combination thereof. In some embodiments, as shown with the connection 619, the memory device 100 can include at least one network interface so that it can communicate separately with other devices via communication network(s) 620. For example, the system link 115 may couple to the communication network 620. In this respect, a memory module or a memory module system of the memory device 100 may have its own network interface so that such a component can communicate separately with other devices via communication network(s) 620.

Each of the computing devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

Also, while a single machine is illustrated for the computing device 602 shown in FIG. 6, the term "machine" shall also be taken to include any collection of machines that individually or jointly execute a set (or multiple sets) of instructions to perform one or more of the methodologies or operations discussed herein. And, each of the illustrated computing devices as well as computing systems can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

While the memory, controller, and data storage parts are shown as single parts, each part should be taken to include one or more parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing devices, that manipulate and transform data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system comprising:
   at least one memory device;
   at least one memory array of a memory device;
   a plurality of memory cells of the at least one memory array, the plurality of memory cells accessible via a plurality of bit lines and a plurality of word lines, wherein at least one multiplicand is stored in the memory array and at least one multiplier is stored in the memory device;
   the at least one memory device being configured to:
      generate a sum of the at least one multiplicand based on a plurality of popcount operations performed on the at least one multiplicand, wherein each of the plurality of popcount operations is configured to determine a total number of high bits present in a single word line of the plurality of word lines; and
      generate a multiplication result based on the sum and by sequencing through bits of the multiplier.

2. The system of claim 1, wherein the sum is generated based on accumulation of a current sum value with the popcount result, in response to the first bit of multiplier having a first predefined value at a corresponding position.

3. The system of claim 2, wherein the sum is generated based on sequencing through positions without accumulating, in response to the bits of the multiplier having a second predefined value at corresponding positions.

4. The system of claim 1, wherein at least one multiplicand is stored along a corresponding bit line.

5. The system of claim 4, wherein the plurality of popcount operations comprises counting the number of bits having the first predefined value for each bit position of the at least one multiplicand.

6. The system of claim 5, wherein the bit positions of the at least one multiplicand are stored along the same word line.

7. The system of claim 4, further comprising a plurality of sense amplifiers, wherein each sense amplifier is coupled to a corresponding bit line, wherein the plurality of sense amplifiers are used to perform the plurality of popcount operations.

8. A system comprising:
   at least one memory device;
   at least one memory array of a memory device;
   a plurality of memory cells of the at least one memory array, the plurality of memory cells accessible via a plurality of bit lines and a plurality of word lines, wherein at least one multiplicand is stored in the memory array and at least one multiplier corresponding to the at least one multiplicand is stored in at least one bit line of the plurality of bit lines in the memory array; and
   the memory device is further configured to generate a dot product result of the at least one multiplicand and the at least one multiplier based on a plurality of popcount operations performed on the at least one multiplicand, wherein the plurality of popcount operations are selectively performed by sequencing through bits of the at least one multiplier stored in the at least one bit line of the plurality of bit lines.

9. The system of claim 8, wherein a set of popcount operations generates a popcount result for each bit position of bits of the at least one multiplier.

10. The system of claim 9, wherein each popcount result is generated by selectively applying the plurality of popcount operations on the at least one multiplicand, and each popcount operation comprises counting the number of bits with a first value for each bit position of the at least one multiplicand.

11. The system of claim 10, wherein each popcount result is generated in response to a bit of the at least one multiplier having a first predefined value at a corresponding bit position, and bypassed in response to a bit of the at least one multiplier having a second predefined value at a corresponding bit position.

12. The system of claim 10, wherein the at least one multiplier is stored along odd-numbered bit lines, wherein the at least one multiplicand is stored along even-numbered bit lines.

13. The system of claim 10, wherein each pair of consecutive bit lines is coupled to a respective sense amplifier.

14. The system of claim 10, wherein each dot product calculation among a plurality of dot product calculation is generated from a group of multipliers with corresponding multiplicands.

15. A method comprising:
storing a plurality of multiplicand and corresponding multipliers in a memory device, the memory device comprising a plurality of memory cells accessible via a plurality of bit lines and a plurality of word lines;
generating a dot product result by summing multiplications of each multiplicand and corresponding multiplier, wherein the dot product result is generated by:
sequencing through positions of bits of the multipliers;
selectively applying a plurality of popcount operations on the multiplicands based on the bit value of a current bit position of a corresponding multiplier to generate a popcount result, wherein each one of the plurality of popcount operations is performed on bits of a single word line of the at least one memory array; and
selectively accumulating the at least one popcount result;
wherein the dot product result is generated upon completing the sequencing.

16. The method of claim 15, wherein the dot product result is generated as value in a feature map used in a convolutional neural network.

17. The method of claim 15, wherein the multipliers are stored in a first memory array and wherein the multiplicands are stored in a second memory array that is different from the first memory array.

18. The method of claim 15, wherein the multipliers are stored along odd-numbered bit lines, wherein the multiplicands are stored along even-numbered bit lines.

19. The method of claim 15, wherein each pair of consecutive bit lines are coupled to a respective sense amplifier.

20. The method of claim 19, wherein the sense amplifiers are used to perform the plurality of popcount operations.

21. A method comprising:
storing at least one summand in a memory array of a memory device, the memory array comprising a plurality of memory cells accessible via a plurality of bit lines and a plurality of word lines;
generating a fused multiply-accumulation result by multiplying a multiplier by the popcount result of the at least one summand and accumulating it to the sum;
generating a popcount result by applying a plurality of popcount operations on the at least one summand, wherein each one of the plurality of popcount operations is performed on only one bit of each of the at least one summand; and
selectively accumulating a current sum value with the popcount result by sequencing through at least one bit of the multiplier;
wherein the fused multiply-accumulation result is generated upon completing the sequencing through the at least one bit of the multiplier.

22. A system comprising:
at least one memory device;
at least one memory array of a memory device;
a plurality of memory cells of the at least one memory array, the plurality of memory cells accessible via a plurality of bit lines and a plurality of word lines, wherein at least one multiplicand is stored in the memory array and at least one multiplier corresponding to the at least one multiplicand is stored in the memory array; and
the memory device is further configured to generate a dot product result of the at least one multiplicand and the at least one multiplier based on a plurality of popcount operations performed on the at least one multiplicand, wherein the plurality of popcount operations are selectively performed by sequencing through bits of the at least one multiplier, wherein the at least one multiplier is stored along odd-numbered bit lines, and wherein the at least one multiplicand is stored along even-numbered bit lines.

23. A method comprising:
storing a plurality of multiplicand and corresponding multipliers in a memory device, the memory device comprising a plurality of memory cells accessible via a plurality of bit lines and a plurality of word lines;
generating a dot product result by summing multiplications of each multiplicand and corresponding multiplier, wherein the dot product result is generated by:
sequencing through positions of bits of the multipliers;
selectively applying a plurality of popcount operations on the multiplicands based on the bit value of a current bit position of a corresponding multiplier to generate a popcount result; and
selectively accumulating the at least one popcount result;
wherein the dot product result is generated upon completing the sequencing
wherein the multipliers are stored along odd-numbered bit lines, and
wherein the multiplicands are stored along even-numbered bit lines.

* * * * *